(12) United States Patent
Panda

(10) Patent No.: US 10,394,495 B2
(45) Date of Patent: Aug. 27, 2019

(54) FORM DOCUMENT SUBMISSION SYSTEM WITH ERROR FINDER MODULE

(71) Applicant: KYOCERA Document Solutions Inc., Osaka (JP)

(72) Inventor: Debashis Panda, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 47 days.

(21) Appl. No.: 15/223,896

(22) Filed: Jul. 29, 2016

(65) Prior Publication Data

US 2018/0032286 A1  Feb. 1, 2018

(51) Int. Cl.
| | |
|---|---|
| G06F 17/24 | (2006.01) |
| G06Q 20/32 | (2012.01) |
| G06F 3/12 | (2006.01) |
| H04N 1/00 | (2006.01) |

(Continued)

(52) U.S. Cl.
CPC ............ *G06F 3/121* (2013.01); *G06F 3/1243* (2013.01); *G06F 3/1288* (2013.01); *G06F 3/1292* (2013.01); *G06F 3/1294* (2013.01); *G06F 17/243* (2013.01); *G06F 17/2725* (2013.01); *G06K 9/00449* (2013.01); *H04N 1/00005* (2013.01); *H04N 1/00039* (2013.01); *H04N 1/00079* (2013.01); *H04N 1/00244* (2013.01); *H04N 2201/0094* (2013.01)

(58) Field of Classification Search
CPC ...... G06F 3/121; G06F 3/1294; G06F 3/1243; G06F 3/1292; G06F 3/1288; G06F 17/243; H04N 1/00244; H04N 1/00039; H04N 1/00079; H04N 1/00005; H04N 2201/0094; H04M 1/576; H04M 1/27455; G06Q 20/3274; G06Q 20/3276

USPC ........................................................ 358/1.14
See application file for complete search history.

(56) References Cited

U.S. PATENT DOCUMENTS

| | | | |
|---|---|---|---|
| 9,374,496 B1 * | 6/2016 | Ishino | ................ H04N 1/00244 |
| 9,715,360 B2 * | 7/2017 | Shimizu | ................ G06F 3/1288 |
| 9,959,584 B1 * | 5/2018 | Frank | ................ H04N 1/00244 |

(Continued)

FOREIGN PATENT DOCUMENTS

JP       2012-63993 A      3/2012

*Primary Examiner* — Benny Q Tieu
*Assistant Examiner* — Juan M Guillermety
(74) *Attorney, Agent, or Firm* — Stein IP, LLC

(57) ABSTRACT

A form document submission system processes a form document with one or more fields to be filled out, and includes a server device to register the form document, a form document identifier associated with the form document, and a form data rule applicable to the form document, so as to be associated with a user; a user accessible device to receive the form document and the form document identifier from the server device, fill out each field with a corresponding input, and send the filled out form, from the user accessible device to the server device; wherein the server device validates the filled out form document for each field, based upon the form data rule, and if an error is found in any of the fields, highlights the field with the error, and sends the highlighted form to the user accessible device, for changes to the corresponding input to comply with the form data rule, and if no error is found in any of the fields, sending the highlighted form to the user accessible device, as confirmation that no error is found.

11 Claims, 16 Drawing Sheets

(51) Int. Cl.
*G06F 17/27* (2006.01)
*G06K 9/00* (2006.01)

(56) References Cited

U.S. PATENT DOCUMENTS

| | | | | |
|---|---|---|---|---|
| 2002/0116276 A1* | 8/2002 | Ottley | ............... | G06Q 30/06 705/27.2 |
| 2002/0198935 A1* | 12/2002 | Crandall, Sr. | ......... | G06F 17/243 709/203 |
| 2004/0225532 A1* | 11/2004 | Gadiyak | ............ | G06F 19/3418 705/2 |
| 2004/0237040 A1* | 11/2004 | Malkin | ............... | G06F 17/243 715/251 |
| 2004/0267595 A1* | 12/2004 | Woodings | ............ | G06F 16/258 705/7.14 |
| 2007/0113168 A1* | 5/2007 | de Souza | ............ | G06F 17/243 715/210 |
| 2007/0171464 A1* | 7/2007 | Nakajima | ............ | G06F 3/1288 358/1.15 |
| 2008/0181501 A1* | 7/2008 | Faraboschi | .......... | G06F 17/243 382/179 |
| 2011/0255107 A1* | 10/2011 | Blau | ..................... | G06F 17/243 358/1.11 |
| 2014/0029046 A1* | 1/2014 | Ponnavalkko | ......... | G06Q 10/10 358/1.15 |
| 2014/0258826 A1* | 9/2014 | Barrus | ................. | G06F 17/243 715/224 |
| 2014/0279516 A1* | 9/2014 | Rellas | ............... | G06Q 20/3276 705/44 |
| 2015/0134555 A1* | 5/2015 | Fancher | ................ | G06Q 10/10 705/321 |
| 2015/0347540 A1* | 12/2015 | Singh | ............... | G06F 17/30371 707/602 |
| 2016/0062972 A1* | 3/2016 | Ramakrishnan | ...... | G06F 17/243 715/226 |
| 2017/0017939 A1* | 1/2017 | Killoran, Jr. | .......... | G06Q 20/102 |
| 2017/0220966 A1* | 8/2017 | Wang | ................ | H04L 63/1433 |

* cited by examiner

Application for Employee Enrollment in Advanced Education Course(s)

*Please note:* Supporting documents must be attached in order to receive reimbursement (statement of cost, course description, class syllabus). A copy of final grades & paid invoice must be provided to HR once class is completed.

Section A: *(To be completed by employee)*
Employee Name: _____  Date of Hire: _____

Position/Job Title: _____  Dept/Region: _____

Course Title/Subject Matter: _____

School/Institution/Training Center: _____  Location of Course Site: _____

Cost of Course: _____  Date of Course: _____

Section B: *(To be completed by employer)*  ← 200

*Approved Cost of Course: _____

To assist in evaluating this application, the Department Head is requested to provide information to support this request:

a) What relationship does this course have to the employee's position or job?
_____
_____ b) What benefit can you expect from having the employee take this course?
_____
_____ c) How will you transfer the knowledge to other managers, employees for their benefit?
_____
_____

_____     _____
(Department Head Signature)              (Date)

Human Resources Comments:
_____
_____

_____     _____
(Human Resources Dept. Manager)          (Date)

*Revised 1/13/2016*

FIG. 2

Domestic Air Ticket Request Form

This form is required when requesting issuance of ticket(s) from Admin or before you purchase your ticket on the web. Please submit the completed form to your manager for approval.
When submitting the approved form(s) to Admin Personnel, please ensure that the form has all the required Information.

Manager: _____  Date _____  Department # _____

Purpose of trip _____

Traveler Information

Name _____

Airline _____  ← 210

Special Accommodations _____

Itinerary

Departure

Date _____  From (City) _____  Country: United States
           To (City) _____  Country: Japan

Return

Date _____  ☐ Round Trip / Same as departure city and country
           From (City) _____  Country: Japan
           To (City) _____  Country: Japan "Internal Use Only"                Total Ticket Price $ _____

General Manager
Signature _____        Date _____

FIG. 3

TRAVEL EXPENSE REPORT

Please sign, attach scanned copy receipts and e-mail this request to your manager.

| NAME | | | EMP # | | DATE | | 10/28/14 |
|---|---|---|---|---|---|---|---|
| OFFICE | | DEPT | | | FOR WEEK ENDING (Saturday) | | 11/01/14 |

PURPOSE OF TRIP:

| | SUN | MON | TUE | WED | THR | FRI | SAT | |
|---|---|---|---|---|---|---|---|---|
| DATE | | | | | | | | |
| CITY | | | | | | | | |
| DEPARTURE TIME | | | | | | | | |
| ARRIVAL TIME | | | | | | | | |
| LODGING | | | | | | | | 0.00 |
| BREAKFAST | | | | | | | | 0.00 |
| LUNCH | | | | | | | | 0.00 |
| DINNER | | | | | | | | 0.00 |
| PLANE/RAIL/BUS/MILES | | | | | | | | 0.00 |
| TAXI/BUS/ST. CAR FARE/TRAIN | | | | | | | | 0.00 |
| GAS, OIL, LUBE, WASH | | | | | | | | 0.00 |
| PARKING | | | | | | | | 0.00 |
| ENTERTAINMENT* | | | | | | | | 0.00 |
| CAR RENTAL | | | | | | | | 0.00 |
| TOLL | | | | | | | | 0.00 |
| MILEAGE | | | | | | | | 0.00 |
| PAID EXPENSES - RECEIPTS REQUIRED | | | | | | | | |
| OTHER | | | | | | | | 0.00 |
| | | | | | | | | 0.00 |
| TOTALS _____ % | 0.00 | 0.00 | 0.00 | 0.00 | 0.00 | 0.00 | 0.00 | 0.00 |

| DETAILS OF EXPENDITURES MARKED* | | TOTAL COST OF TRIP | | 0.00 |
|---|---|---|---|---|
| DATE | | PURPOSE | | AMOUNT |
| | | | | |

| MILEAGE RECORD | | | CASH ADVANCED | CHK NO | |
|---|---|---|---|---|---|
| END OF TRIP | 0 | Mileage Reimb. | TOTAL CASH PAID OUT | | 0.00 |
| STARTING MILEAGE | 0 | | REFUND TO COMPANY | | 0.00 |
| MILES THIS TRIP | 0 | 0.00 | ADDITIONAL CASH DUE EMPLOYEE | CHK NO | 0.00 |

| SIGNED | APPROVED | APPROVED |
|---|---|---|
| | | |

Admin Dept Use Only.
Reviewed:      Date:

REV 05-2012

FIG. 4

| Application for Employee Enrollment in Advanced Education Course(s) |

*Please note:* Supporting documents must be attached in order to recline reimbursement important of cost, course description, class syllabus?? A copy of final grades & paid invoice must be provided to HR once class is completed Section A: *(To be completed by Employee)*     Autofill Employee Name: _____ Date of Hire: _____

Position/Job Title: __Software Engineer__ Dept/Region: _____

Course & Title/Subject Matter: _____

School/Institution/Training Center: _____ Location of Course Site: _____

Cost of Course: _____ Date of Course: _____

Section B: *(To be completed by employer)*

*Approved Cost of Course: _____

To assist in evaluating this application the Department Head is requested to provide information to support this request:

a) What relationship does this course have to the employee's position or job?

_____

_____ b) What benefit can you expect from having the employee take this course?

_____

_____ c) How will you transfer the knowledge to other managers, employees for their benefit?

_____

_____

_____      _____
*(Department Head Signature)*      *(Date)*

Human Resources Comments:

_____

_____

_____      _____
*(Human Resources Dept. Manager)*      *(Date)*

FIG. 11

FORM DOCUMENT SUBMISSION SYSTEM WITH ERROR FINDER MODULE

BACKGROUND OF THE INVENTION

1. Field of the Invention

In some office environments, people such as employees may have to submit a document in the same format multiple times for different events. For example, after each business trip, a travel expense report may be required to be submitted. This type of document requires an employee (user) to fill in user identification information and some items related to each trip, which is the same each time for the employee. Other items are specific for each trip, but in most cases, the other items can be expected to be a few values which fall within respective ranges according to company travel policy. It is very easy to make an error by not filling in a required value or to fill in a value which is outside of the acceptable range for that employee. Therefore, a workflow with an error finder module which can enable people to be notified of these small errors before submitting has been demanded. This improved workflow can improve efficiency of processing, rather than wasting the time of the employee to submit an error containing form and that of a supervisor or administrator who has to approve the form.

2. Description of the Related Art

JP 2012-063993 discloses an image forming system which checks an original document and reports the checked result using a scan ticket including highlighted fields necessary to be checked.

SUMMARY OF THE INVENTION

According to an aspect of the present invention, there is provided a method for processing a form document with one or more fields to be filled out, comprising: registering, at a server device, the form document, a form document identifier associated with the form document, and a form data rule applicable to the form document, so as to be associated with a user; receiving, at a user accessible device, the form document and the form document identifier; filling out each field with a corresponding input, at the user accessible device; sending the filled out form, from the user accessible device to the server device; validating the filled out form document for each field, based upon the form data rule, at the server device; if an error is found in any of the fields, highlighting the field with the error, and sending the highlighted form, from the server device to the user accessible device, for changes to the corresponding input to comply with the form data rule; and if no error is found in any of the fields, sending the highlighted form, from the server device to the user accessible device, as confirmation that no error is found.

According to another aspect of the present invention, there is provided a form document submission system for processing a form document with one or more fields to be filled out, comprising: a server device to register the form document, a form document identifier associated with the form document, and a form data rule applicable to the form document, so as to be associated with a user; a user accessible device to receive the form document and the form document identifier from the server device, fill out each field with a corresponding input, and send the filled out form, from the user accessible device to the server device; wherein the server device validates the filled out form document for each field, based upon the form data rule, and if an error is found in any of the fields, highlights the field with the error, and sends the highlighted form to the user accessible device, for changes to the corresponding input to comply with the form data rule, and if no error is found in any of the fields, sending the highlighted form to the user accessible device, as confirmation that no error is found.

According to still another aspect of the present invention, there is provided a method, comprising: registering, at a server device, a form document with one or more fields, a form document identifier associated with the form document, and a form data rule applicable to the form document, so as to be associated with a user; retrieving, at a client computing device of the respective user, the form document and the form document identifier; filling, at the client computing device, data into the one or more fields of the form document; sending, from the client computing device to the server device, the form document with the filled fields and the form document identifier; validating, at the server device, the form document, based on the form data rule corresponding to the form document identifier; sending, from the server device to the client computing device, the validation result; displaying, at the client computing device, the validation result; and submitting, from the mobile computing device to the server device, the filled form document, upon determining no error is found.

According to still another aspect of the present invention, there is provided a method, comprising: registering, at a server device, a form document with one or more fields, a form document identifier associated with the form document, and a form data rule applicable to the form document, so as to be associated with a user; authorizing, at an image forming device, the respective user; retrieving, at the image forming device, the form document and the form document identifier; printing, at the image forming device, the retrieved form document with the form document identifier; scanning, at the image forming device, the form document with fields filled by the user, and transmitting the scanned form document to the client computing device; sending, from the client computing device to the server device, the form document with the filled fields and the form document identifier to the server device; validating, at the server device, the form document, based on the rule corresponding to the form document identifier; sending, from the server device to the image forming device, the validation result; printing, at the image forming device, the validation result; and submitting, from the image forming device to the server device, the filled form document, upon determining no error is found.

According to still another aspect of the present invention, there is provided a server device for a form submission workflow device for processing a form document with one or more fields to be filled out, for use with a user accessible device, comprising: a registration device to register the form document, a form document identifier associated with the form document, and a form data rule applicable to the form document, so as to be associated with a user; a transmission device to send the form document and the form document identifier to the user accessible device, and receive a filled out form document with each field having a corresponding input from the user accessible device; an error finder module to validate the filled out form document for each field, based upon the form data rule, and if an error is found in any of the fields, highlights the field with the error wherein the transmission device sends the highlighted form to the user accessible device, for changes to the corresponding input to comply with the form data rule, and if no error is found in any of the fields, sends the highlighted form to the user accessible device, as confirmation that no error is found.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is an example of an employee education form according to the embodiment of FIG. 1;

FIG. 3 is an example of an employee travel request form according to the embodiment of FIG. 1;

FIG. 4 is an example of an employee travel request form according to the embodiment of FIG. 1;

FIG. 11 is an example of a highlighted form showing errors of a filled out form on a display unit according to various embodiments;

DETAILED DESCRIPTION OF THE EMBODIMENTS

Figure 1:
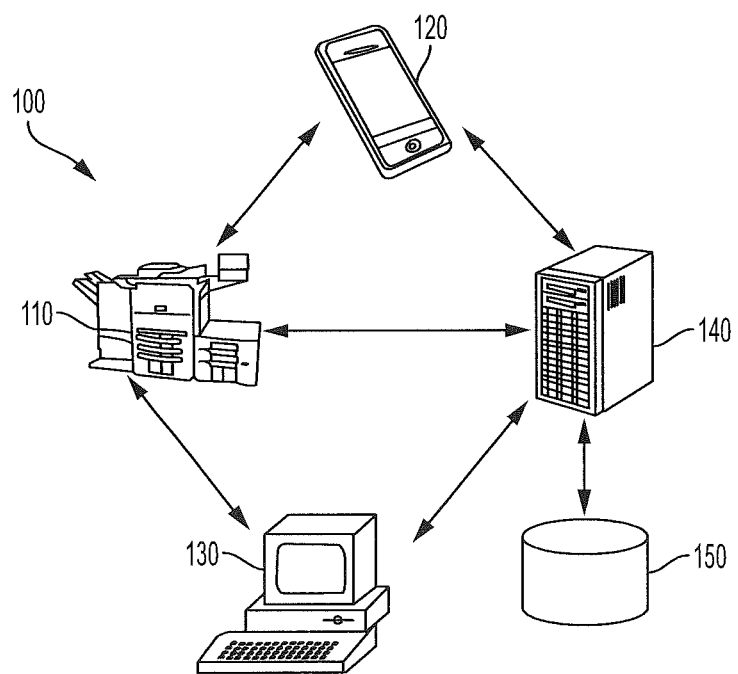
FIG. 1 is a view of an image forming system to provide a form document submission workflow according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When an employee or other user needs to fill out a form, particularly one that is commonly used throughout the organization, it is helpful to have some of the fields of the form auto-filled, such as name, title, position and/or whatever other identifiers are used to identify the employee. Plus, it would save both the employee's time and that of a supervisor or administrator if the employee turned in a form that was free of errors, whether the error be a missing field or an input value that is out of an acceptable range for that field.

Therefore, it would be helpful to have an image forming system which can take an image of the filled out form or document, using a mobile device like a cell phone or tablet, or using a multi-function peripheral (MFP) or scanner, or other image forming device, and notify the user of the field(s) of the form which contain an error. The notification may be by highlighting at least a portion of the field with the error or some other method of notification. In this way, the user can make changes to the field(s) with an error, check again, and if the image forming system indicates no error in the form, the user can then submit the form to the supervisor or administrator.

According to an embodiment of the present invention, as shown in FIG. 1, there is a form document submission system 100 including an image forming device 110, a client computing device 120, an administrator computing device 130, and a server device 140, such as a cloud server or an external server. One or more forms are generated and stored on the server device 140. The image forming device 110 may be a multi-function peripheral (MFP) with a scanning function, a printer/scanner or other image forming device with scanner functionality. Examples of such forms are an employee education form 200, a travel request form 210 and a travel request form 220, as shown in FIGS. 2-4. Of course, many other types of forms requiring different types of information could be used in the form document submitting system 100. Prior to a user printing out a blank form 200 (or 210 or 220), the user accesses the server device 140 and selects the form the user wants to print, and prints the form using the image forming device 110. The user then fills in some fields. The user may be asked to sign the user's signature by hand.

The user scans the form document 200 using the image forming device 110, and sends the scanned form 200 to the server device 140. The server device 140 executes an error finding operation, to be described later. If any error is found, the erred fields of the scanned document are highlighted (the server device 140 renders a page with the highlighted errors and sends the print job to the image forming device 110 to print out the form with highlighted error's) and then printed out by the image forming device 110. The user corrects the error on the reprinted form and prints a corrected form. The user signs and scans again using the image forming device 110 and submits the corrected form back to the server device 140 to check if there are any more errors. When the server device 140 determines that there are no more errors, the server device 140 submits the form document to the workflow system which can be like a Sharepoint site storing all of the completed forms for further processing, for example.

A brief description of a form document submission workflow according an embodiment of the present invention is provided, for example, in the case of submitting an employee education form 200, a travel expense report form 210, or a travel request form 220 to an administrator of a financial department for the purpose of reimbursement of expenses during a business trip. This kind of form document requires information to specify (identify) an employee and a handwritten signature. The identification information could be the name, employee number, department name, any combination thereof, or whatever other information which is useful to the company to identify the employee. And this form is required to be submitted to a supervisor of the employee. Information to specify the employee is the same regardless of the form selected by the employee to be filled out, but of course various fields require different specific information depending on the selected form. The information in each of the form specific fields could be different in each submission, and should be checked to ensure that the form is accurately filled out. For example, some fields to claim meal expenses may be determined appropriate or not since such fields can be checked to determine if the value inserted therein is within a predetermined range, such as for example, a company travel expense policy. And this field also may be determined whether it should be filled or not depending on when the user leaves the office and comes back. The error finder module may be implemented by having a database or list of form data rules set according to this kind of company policy information.

For example, for breakfast, the meal expense cap may be $12 for an employee who is not management, but $15 for an employee who is part of management. If an employee who is not management tries to enter $13 for breakfast, this will violate the form data rules and an error will be indicated on the reprinted form. As another example, if the company policy is that breakfast is reimbursed only if the employee gets in before 8:00 am, but another field indicates that the employee got in at 8:45 am while seeking reimbursement for breakfast, another error message will be provided, such as highlighting the amount filled in for the breakfast reimbursement. It is also possible for an explanatory error message be provided somewhere on the form to indicate the reason for the error indication.

In the form document submission system 100, the client computing device 120, which may be a mobile device, and the image forming device 110 are communicatively connected via a network. The image forming device 110 and the server device 140 are also connected via a network (the same or different one), and the mobile terminal device 120 and the server device 140 are connected via a network (the same or different one). The client computing device 120 and the image forming device 110 are communicatively connected via any network, or NFC (Near Field Communication) system.

The network, assuming the same one throughout, may be any type of network through which devices may communicate. In some embodiments, the network is a local area network, and in other embodiments, the network is a wide area network, such as the Internet. In some instances, the network includes a combination of local area network and wide area network. For example, the server device 140 may be remote and accessible over a wide area network. The network represents a communicative link through which devices can send data through and/or receive data from.

The client computing device 120 and the image forming device 110 can be connected via Bluetooth or Wi Fi Direct, for example.

Figure 5:
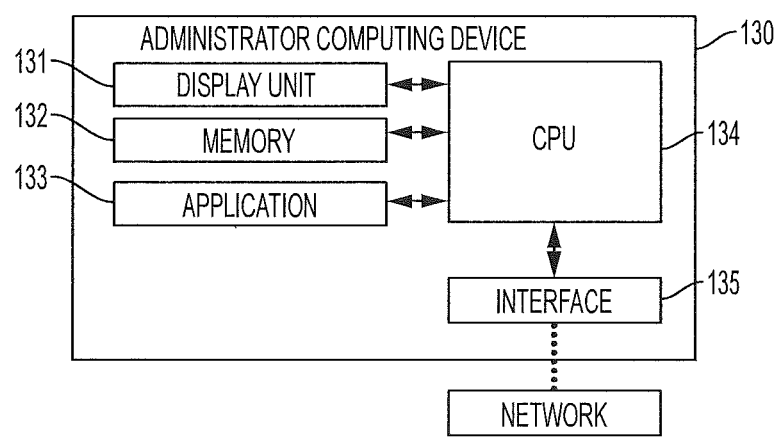
FIG. 5 is a block diagram of an administrator computing device according to the embodiment of FIG. 1.

As shown in FIGS. 1 and 5, the administrator computing device 130 may include a display unit 131, a memory 132, one or more applications 133, a central processing unit (CPU) 134, and an interface 135. In some embodiments, an administrator may open the application 133 and generate or edit a form document. And the administrator may send the form document to the server device 140 and store the form document in a database 150 on the server device 140.

The administrator may register some fields, which require the user to fill in with an input. And the administrator may also register some information (such as numbers, words, or characters) for the necessary fields to be associated with the stored form documents. There, numbers/characters may be extracted from a policy document to be used to fill in the form document. The numbers and characters specify the data type that can be entered in the field. For example, a DOB (date of birth) field can be specified as a number and will not allow characters to be entered. So, the number/character data type is used for data validation purposes. Or in some example embodiments, some typical example errors may also be registered. In some example embodiments, position information such as coordinate information may be registered as necessary field information.

The administrator may further register user identification information, such as user name and/or an employee number on the server device 140. The user identification information may be registered for all users who might have a chance to submit the form document. In some example embodiments, the user identification information stored on the server device 140 may include a manager/administrator/supervisor's information to whom the form document may be submitted. These types of destination addresses may include one or more people/destinations. And these destinations may be in a form of an e-mail address, or some accessible folder or document box associated with the destination user.

The administrator computing device 130 may be any computing device capable of generating a form document. The administrator computing device 130 may be a desktop computer, or other computing device, such as a laptop, tablet, or other computing devices which may act as an administrator computing device 130 for the purposes of generating the form document.

In some example embodiments, the client computing device 120 is owned by the company of the Administrator in an office, the Administrator managing the form document for people in the office. In this example embodiment, the administrator computing device 130 may act as a destination which receives the form documents submitted from the employees.

The server device 140 may be any computing device capable of storing the form document and user information. The server device 140 may store thereon the database 150 containing entries of the stored form documents and those of the user information.

Figure 6:
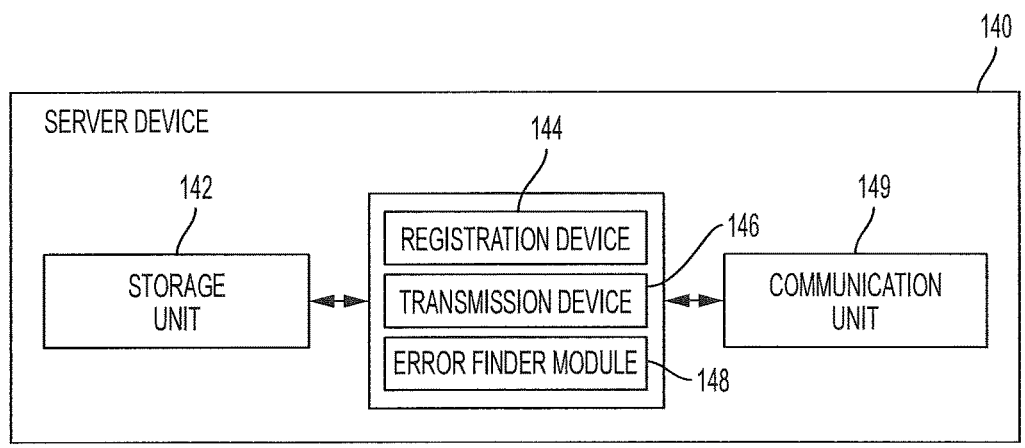
FIG. 6 is a block diagram of a server device shown in FIG. 1.

As shown in FIGS. 1 and 6, the server device 140 has a storage unit 142, a registration device 144, a transmission device 146, an error finder module 148 and a communication unit 149. The storage unit 142 provides memory space for the server device 140, including storing program instructions for the server device 140. The registration device 144 registers (stores, adds new entry and/or renews existing entry) registration information regarding the form documents received from the administrator computing device 130, including the fields to be filled in with and an input, and the information (such as numbers, words, or characters for the necessary fields to be associated with the form documents. The registration device 144 also registers the form document identifier for each document, and form data rules applicable to the form document, so as to be associated with each employee. The transmission device 146 sends the form document and the form document rule to the image forming device 110 and/or the client computing device 120 through the communication unit 149.

The error finder module 148 compares inputs received in the fields from the image forming device 110 and/or the client computing device 120, applies the form data rule to each field of the form document associated with the user, and highlights each field in which the input is not acceptable, as being either an inappropriate entry (such as a number where letters should be and vice versa, or values which are outside the acceptable range for that particular field). Thus, the error finder module 148 validates the filled out form document with each field having a corresponding input.

The communication unit 149 enables communication between the registration device 144 and the error finder module 148, through the transmission device 146, all of the server device 140, and the other devices of the form document submission system 100, including the image forming device 110, the client computing device 120, the administrator computing device 130, and the database 150.

In an embodiment, code having a set of instructions for performing the operations of the server device 140 (and more particularly the storage unit 142, the registration device 144, the transmission device 146, the error finder module 148 and the communication unit 149) may be stored on a non-transitory computer readable medium usable with any compatible hardware element.

In some example embodiments, the server device 140 may be a destination to submit the form document. In this embodiment, the server device 140 may store the submitted form document so that the document can be associated with the stored user information.

In another embodiment, the user information may include information of a supervisor to whom the user submitting the form document reports. When the image forming device 110 submits the form document to the destination, the image forming device 110 submits the same to the supervisor of the user who initiates the form document submission workflow. The information associated with the supervisor may include, for example, name, e-mail address, and/or an address for a folder managed by the supervisor. In some other embodiments, information on an administrator of an office can be registered as the destination to submit the form. The destination information may vary depending on the form document to be submitted.

Figure 7:
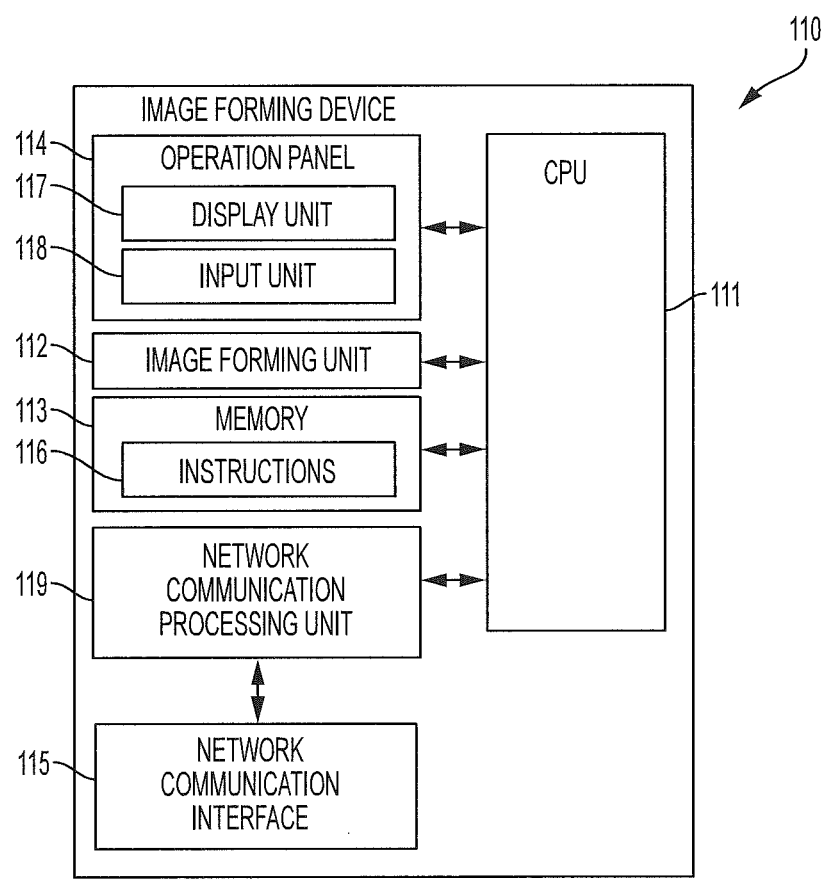
FIG. 7 is a block diagram of an image forming device shown FIG. 1.

As shown in FIGS. 1 and 7, the image forming device 110 may include a CPU 111, an image forming unit 112, a memory unit 113, an operation panel 114, and a network interface 115. The image forming device 110 may be, for example, a printing device or a multi-function peripheral (MFP) including a scanner and one or more of functions of a copier, a facsimile device, and a printer. The image forming device 110 may further include a finisher, and one or more paper cassettes.

The memory unit 113 may store thereon instructions 116, which are executable by the CPU 111 and/or any other processor(s). The memory unit 113 may also store information for various programs and applications, as well as data storage specific to the image forming device 110. For example, the data storage may include data for running an operating system (OS). The memory unit 113 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD), although other types of non-volatile memory are usable. The memory unit 113 may include any combination of readable and/or writable volatile memories and/or non-volatile memories, along with other possible memory devices. Processor(s) including the CPU 111 may include one or more processors capable of executing instructions, such as instructions which cause the image forming device 110 to perform various operations. The processor(s) may also incorporate processing units for specific purposes, such as application-specific integrated circuits (ASICs) and field-programmable gate arrays (FPGAs). Other processors may also be included for executing operations particular to the image forming device 110.

The operation panel 114 may include a display unit 117 and an input unit 118 for facilitating human interaction with the image forming device 110. The display unit 117 may be any electronic video display, such as a liquid-crystal display (LCD) or another type of display. The input unit 118 may include any combination of devices that allow users to input information into the operation panel 114, such as buttons, a keyboard, switches, and/or dials. In addition, the input unit 118 may include a touch-screen digitizer overlaid onto the display unit 117 that can sense touch and interact with the display unit 117.

The image forming device 110 may include a network communication processing unit 119. In some example embodiments, the image forming device 110 may further include a near field communication processing unit whose maximum communication distance is less than that for the network communication. These communication units can establish a network communication, such as wireless or wired with the administrator computing device 130 and the server device 140. In some example embodiments, the image forming device 110 may establish a near field communication with the client computing device 120, in the image forming system according to aspects of the present invention.

A USB keyboard, which can be a soft keyboard which is displayed and connected to a front panel of the image forming device 110, may enable a user to edit/fill out some fields easily. This can be effective in a case where the user edits/corrects the erred fields on the image forming device 110.

Figure 8:
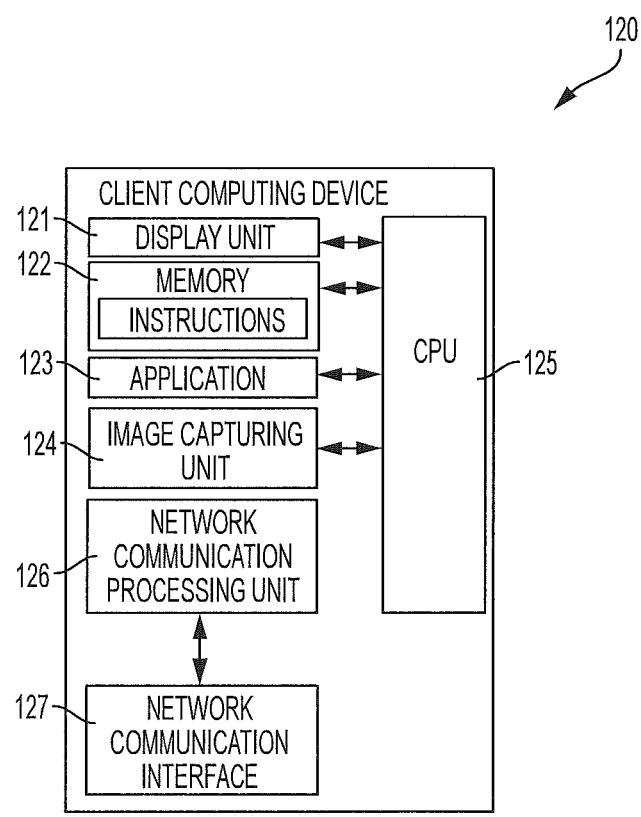
FIG. 8 is a block diagram of a client computing device shown in FIG. 1.

As shown in FIGS. 1 and 8, the client computing device 120 may be, for example, a mobile computing device and may include a display unit 121, a memory unit 122, an application 123, an image capturing unit 124, and a CPU 125. The mobile computing device 120 may include a network communication processing unit 126 and a network communication interface. In some example embodiments, where the client computing device 120 is the mobile computing device, a near field communication processing unit may be implemented as well to communicate with the image forming device 110.

The client computing device 120 may be connected to the network via a wireless connection. The client computing device 120 may include a touch screen through which information can be displayed and user input can be received. In some other example embodiments, the client computing device 120 may include a display and separate input devices. In some embodiments, the mobile computing device 120 may be configured to perform the same or similar operations as that of the administrator computing device 130. For example, the mobile computing device 120 may generate and/or edit the form document. The client computing device 120 may be, for example, a mobile phone, a smart phone, or a tablet.

As noted previously, the error finder module 148 may be on the server device 140. The error finder module may be configured to use an OCR (optical character recognition) reader and figure out errors by comparing recognized characters and stored example characters' information.

The error finder module 148 works as follows. The error finder module may contain a Table 1 such as below:

TABLE 1

| Form Name = Employee Education form [FRM 13231] | |
|---|---|
| Name | Value |
| Employee Name | Cannot be Empty |
| Date of Hire | Cannot be Empty |
| Position | Cannot be Empty |
| ... | Cannot be Empty |
| ... | Cannot be Empty |
| Approved cost of Course | Cannot be Empty |

When the document form is scanned, the error finder module 148 does an OCR and creates such a Table 1 for all the fields on the form. For example, a comparison of the values will indicate that "Approved Cost of Course" should not/cannot be empty, but in the actual form it is empty. So a red box (or highlighted box or otherwise indicated as being a different box) will be drawn around the field indicating the error. This form with the red box will be printed out by the MFP 110 so that the user will immediately see the validation error.

The error finder module 148 may be configured to execute an image comparison tool to figure out errors. In some other example embodiments, the error finder module 148 may be configured to user augmented reality. In this instance, augmented reality is the part which superimposes an image over the actual document. It can fill in the missing fields on the document and show in color over the actual form.

TABLE 2 below illustrates a display listing form documents available to the user on the front panel of the image forming device (MFP) 110 instead of using a separate computer.

TABLE 2

| Index | Document Name | Form # |
|---|---|---|
| 1 | Employee Education reimbursement | FRM 13231 |
| 2 | Travel expense | FRM 2233 |
| 3 | Check request form | FRM 3311 |
| ... | ... | ... |

Figure 9:
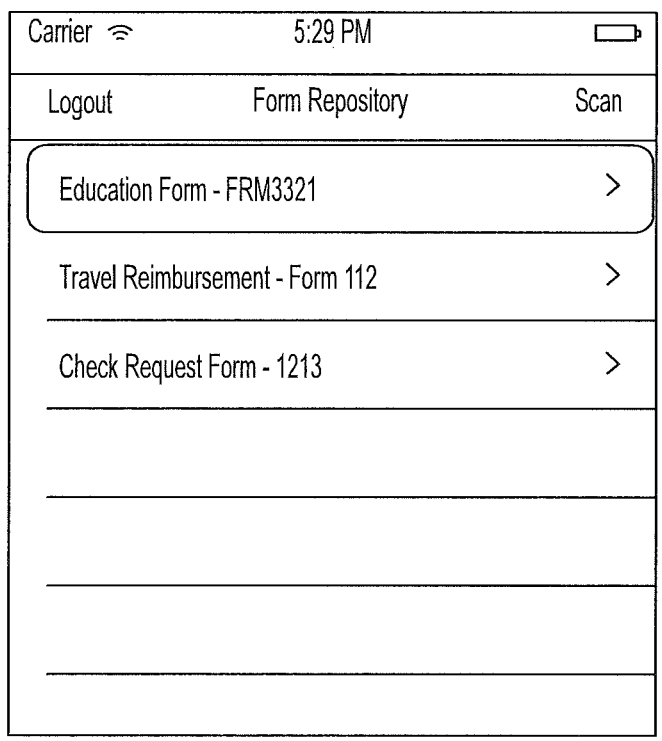
FIG. 9 is an example of an employee form list on a display unit of a client computing device of FIG. 1.

FIG. 9 shows an example form document list which would appear on the client computing (mobile display) device 120 of the employee so that the employee is able to select the form document desired using the client computing device 120 FIG. 9 shows another interface from which the forms can be accessed. As the actual location of the form is in the service device 140 as shown in FIG. 1, the client computing device 120. or the MFP 110 front panel can display the same list of forms.

Figure 10:
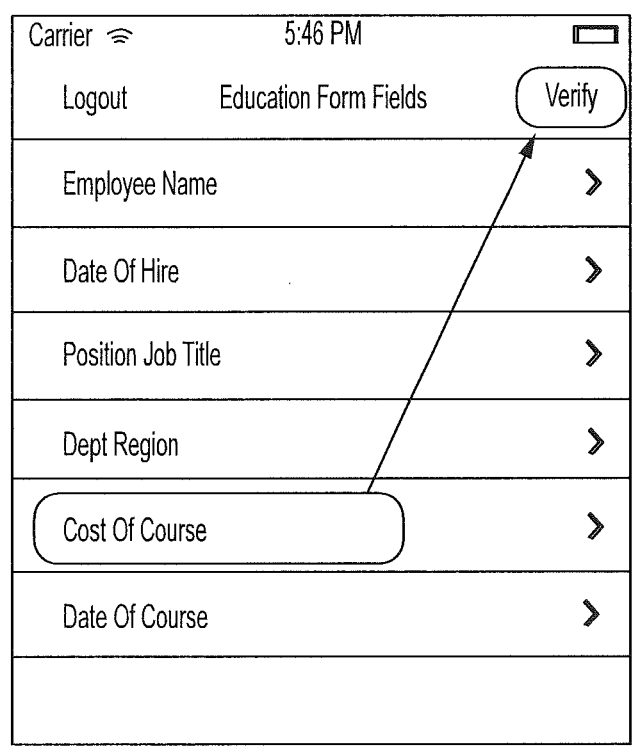
FIG. 10 is an example of verification shown on the client computing device of FIG. 1 after an error finder module is executed.

After the employee chooses one desired form, the screen of the client computing device 120 will appear as shown in FIG. 10. A button can be displayed to prompt the employee to choose auto-fill. In some example embodiments, the user may choose to fill in some fields manually, or automatically, or both. The "verify" button displayed initiates some operations in the error finding process, such as printing, scanning.

After the operation of the error finder module 148 is executed, the form document with erred fields highlighted is transmitted by the transmission device 146, through to the communication unit 149 and may be displayed on the client computing device 120 as shown in FIG. 11.

Figure 12:
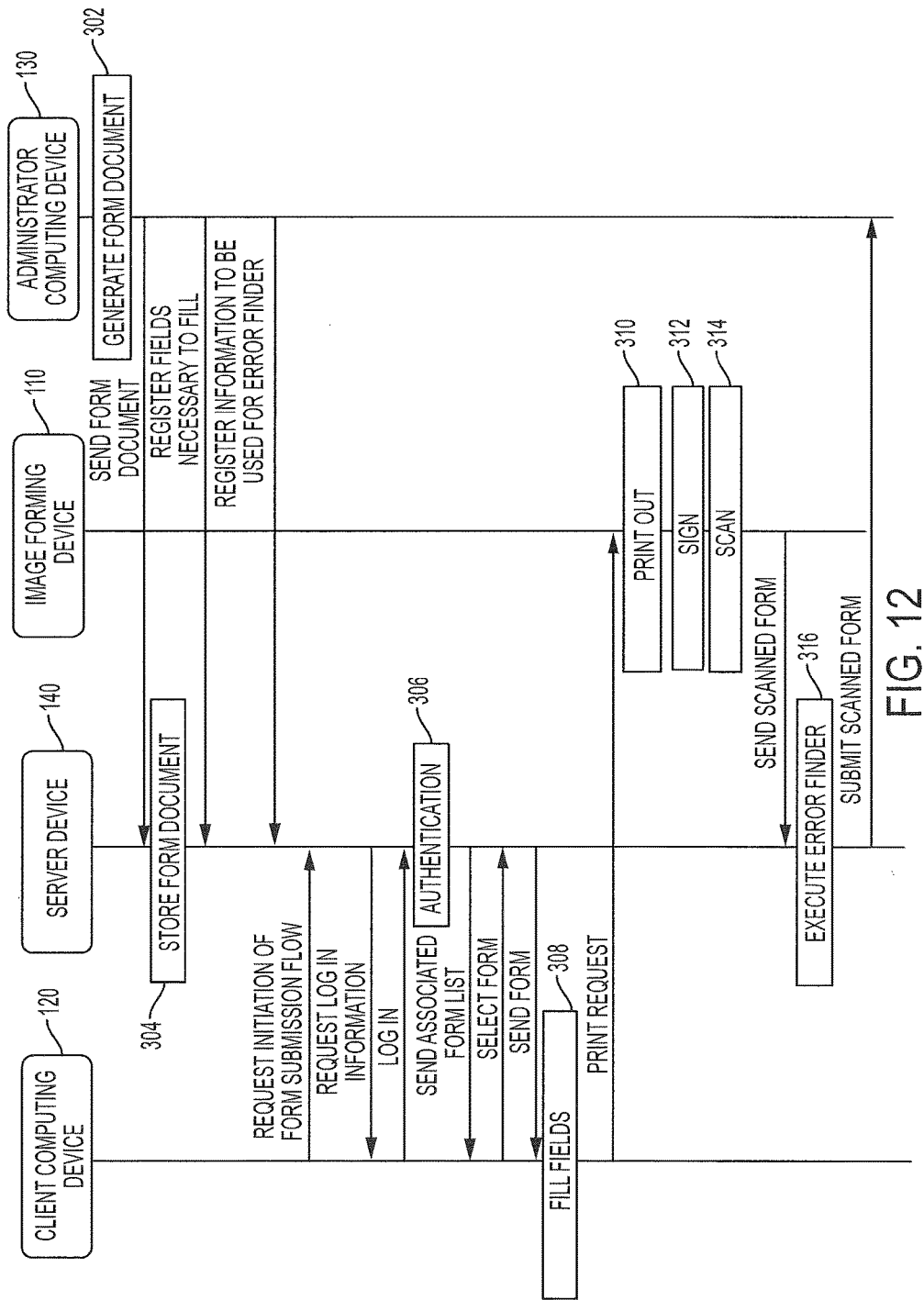
FIG. 12 is a form document submission flow process flowchart according to various embodiments.

FIG. 12 shows a sequence of operations for the form document submission workflow process for finding errors, correcting them and sending an error free form to a supervisor or administrator, according to one embodiment.

Initially, the sequence starts by the administrator generating a form document in operation 302 using the administrator computing device 130. The form document is sent to the server device 140 and stored in operation 304. For example, an administrator creates, using the administrator computing device 130 the form document, sends, and stores the document on the server device 140, in some typical example embodiments, on a cloud server, to be ready for future use. The administrator may register information for some fields necessary to be filled out by an employee and also information for the registered fields to be used for the error finder module 148 on the server device 140. The client computing device 120 then requests initiation of the form submission workflow process, the server device 140 requests log in information from the client computing device 120, and the employee logs in to the server device 140 using the client computing device 120. The server device 140 performs an authentication process in operation 306, and if successful, the server device 140 sends an associated (available to) form list to the client computing device 120 as shown in Table 2 and FIG. 9, and the employee selects one of the forms using the client computing device 120. The server device 140 then sends the selected form to the client computing device 120, where the employee fills in the required fields in operation 308. Once completed, the client computing device 120 sends a print request to the image forming device 110. The image forming device 110 prints out the completed form in operation 310, the employee signs the printed out form in operation 312 and scans the signed filled out form using the scanner feature of the image forming device 110 in operation 314.

The image forming device 110 sends the executed scanned form to the server device 140 for execution using the error finder module 148 in operation 316. If there are no errors, the scanned form is then submitted to the administrator computing device 130.

In some example embodiments, a special workflow application can be added to the client computing device 120.

A list of form documents currently available is displayed on, for example, a display unit of the client computing device 120. In some embodiments, the list may be a list of names of the form with associated information, such as an author, a requester, a date on which the form is created, a due date to submit, an expiration date, etc. In some other example embodiments, the list may display thumbnail images of the available forms.

In some example embodiments, one single form document is available and only one form is displayed, or this operation of displaying the list can be skipped.

The employee selects one or more form documents to submit via the display unit of the client computing device 120. If the employee sees the list on the client computing device 120, the employee may select the form document on the mobile terminal device 120.

The server device 140 sends back the selected form document. In some example embodiments, some information associated with the employee may be sent automatically (see fill fields) (operation 308). In some other example embodiments, the employee information may be filled in the selected form document before the form document is sent to the employee.

The employee information may include, an employee name, a certain employee number to identify the employee, the employee location, the employee office, an organization identification to which the employee belongs, an identification of a manager/administrator/supervisor for the employee, etc.

In some example embodiments, the server device 140 may let the client computing device 120 display the retrieved user information and request the employee to check and edit, if necessary.

In some example embodiments, the employee may request the image forming device 110 to generate a print preview of the form document on the display unit 117. The employee may check the print preview and change the setting configuration to print out the form document (operation 310), if necessary.

In some other example embodiments, the user may edit the filled out texts/numerals after checking the print preview.

These changes may be performed on the employee's client computing device 120 or display unit 117 of the operation panel 114 of the image forming device 110.

In some example embodiments, the user may check the revised document according to the changed configuration setting and/or edition, if necessary.

After printing in operation 310, in some example embodiments, the image forming device 110 may request the employee to fill in his/her signature in operation 312 by hand writing. In other embodiments, the signature can be done electronically. In parallel, the employee may be requested to fill some other fields in operation 308 for customized items.

After filling the signature out, the employee may request the image forming device 110 to scan the signed form in operation 314 and to send the form to the server device 140.

This process of filling the signature in operation 312 can be performed after the error finder module 148 is executed in operation 316 and before submitting the form document to the administrator computing device 130.

The server device 140, which may be the cloud, or a server on site, may execute the error finder module 148 in operation 316 on the sent form document.

In some example embodiments, the cloud server device 140 may notify the image forming device 110 that no error is found. The image forming device 110 may submit the form document to, for example the administrator at the administrator computing device 130.

In some example embodiments, the server device 140 may store respective destination information to submit the form document, associated with the employee and the server device 140 may be configured to submit the form document to the appropriate destination according to the destination information. Once the server device 140 finishes the validation, it can send the success message to the image forming device 110 with the destination address of the form. The image forming device 110 will then email it to that location.

In some other example embodiments, the form document may be submitted to the cloud server device 140. Every form can have a field associated with it called the destination. When the form is stored in the database 150, the destination entry is also filled out. When the server device 140 receives a completed form, it identifies the form number from a barcode on the form, and after validation, if no errors were found, the server device 140 (and not the MFP 110) will email the form to its destination email address. The destination may be a folder, e-mail address, and so on associated with the administrator/manager/supervisor for the employee, which may be retrieved from the employee information from the server device.

In some example embodiments, the destination device may send a notice to the employee to notify the employee of safe receipt of the submitted form. The notice may be sent to the image forming device 110 and/or the client computing device 120. The receipt notice may include information of the destination, or information on the database 150 to store a copy of the submitted form document. This enables the employee to check the submitted form afterward.

Figure 13:
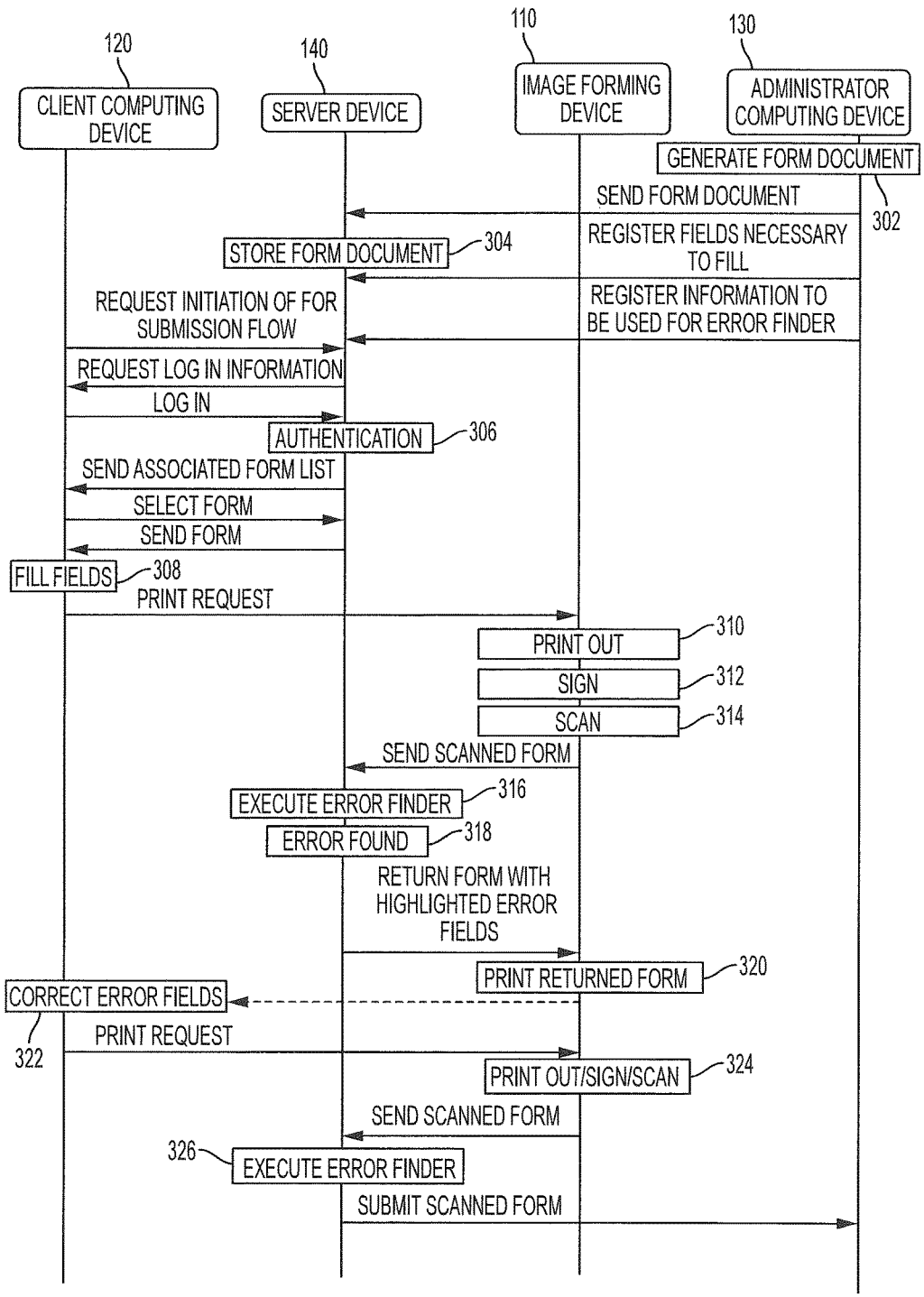
FIG. 13 is a form document submission flow process flowchart according to other various embodiments.

FIG. 13 shows the workflow process according to a situation when an error is found in the scanned form, in contrast to FIG. 12 where no error was found in the scanned form. The operations 302-316 as described above with reference to FIG. 12 are the same. However, in this situation the error finder module 148 in the server device 140 may find one or more errors, such as an empty required field, or a value or input that is not within the range allowed by company policy or other set of rules, in operation 318. The employee is notified of the errors, by, for example, printing the form with highlighting of the erred fields in operation 320 using the image forming device 110. The employee then corrects the errors, in operation 322 by filling in empty fields or changing values/characters to be in acceptable ranges or using acceptable language. The employee is provided with an option to print out another copy of the form which has everything filled out except for the fields which have an error, so that the employee can fill them out again and scan for validation and repeat the process. The employee generates a print request, by having the scanner function of the image forming device 110 or the client computing device 120 take a scanned image of the revised form and prints out the scanned revised form using the image forming device 110, signs the revised form, and rescans the revised form in operation 324. In operation 326, the server device re-executes the error finding module to check for errors. If no more errors are found, the scanned revised form is sent from the server device 140 to the administrator computing device 130.

Figure 14:
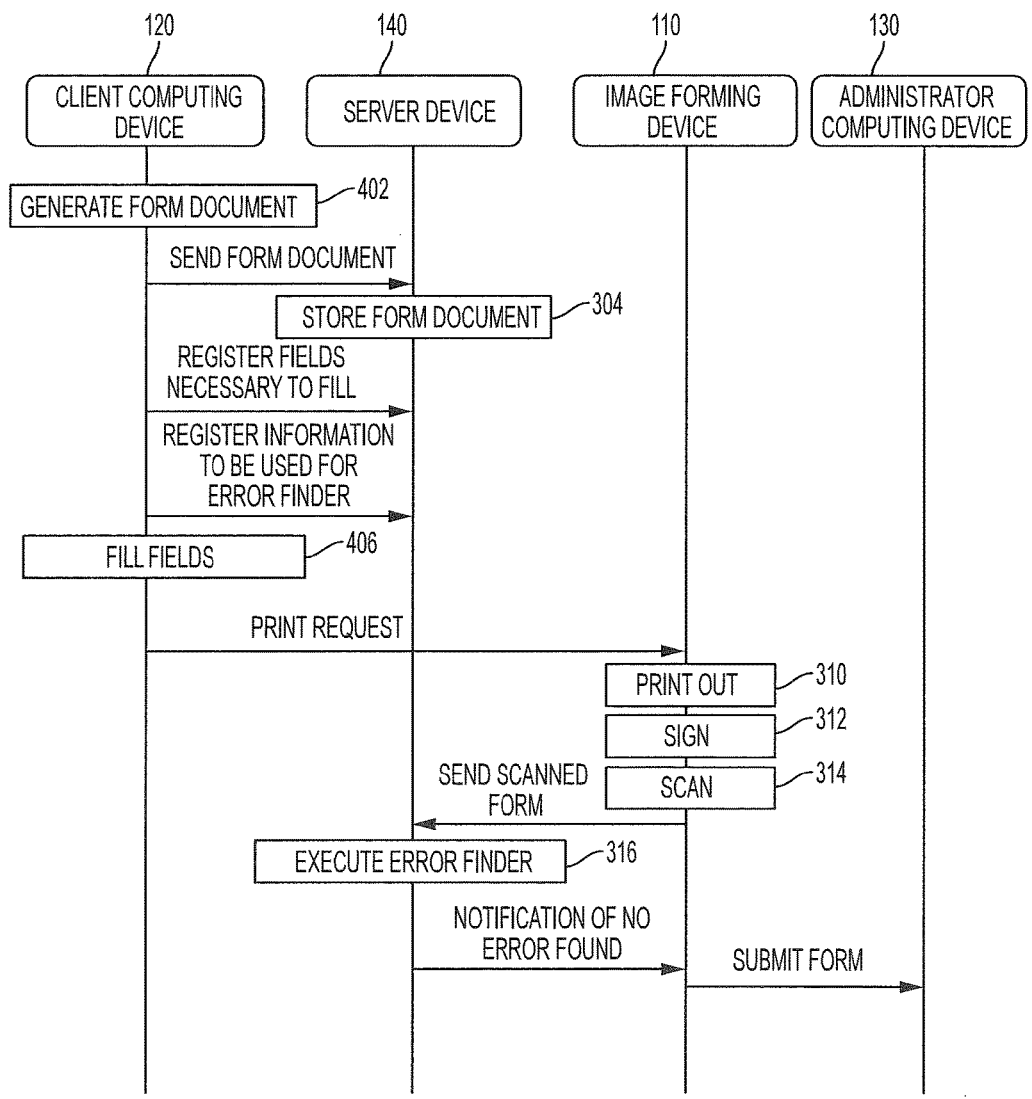
FIG. 14 is a form document submission flow process flowchart according to still other various embodiments.

FIG. 14 shows the workflow process according to another embodiment, where instead of the administrator computing device 130 generating the form document in operation 302, the employee generates the form document in the client computing device 120 in operation 402, sends the form document to the server device 140 and the server device 140 stores the form document in operation 304. The employee registers the fields necessary to be filled in, registers information to be used by the error finder module 148 and fills in the fields of the form document in operation 406. The employee generates a print request and sends the same to the image forming device 110. The image forming device 110 prints out the filled in form in operation 310, the employee signs the filled in form in operation 312 and scans the same using the image forming device 110 in operation 314, and sends the scanned form to the server device 140 which executes the error finder module 148 on the scanned form in operation 316, and if there are no errors, the server device 140 submits the scanned form to the administrator computing device 130.

Figure 15:
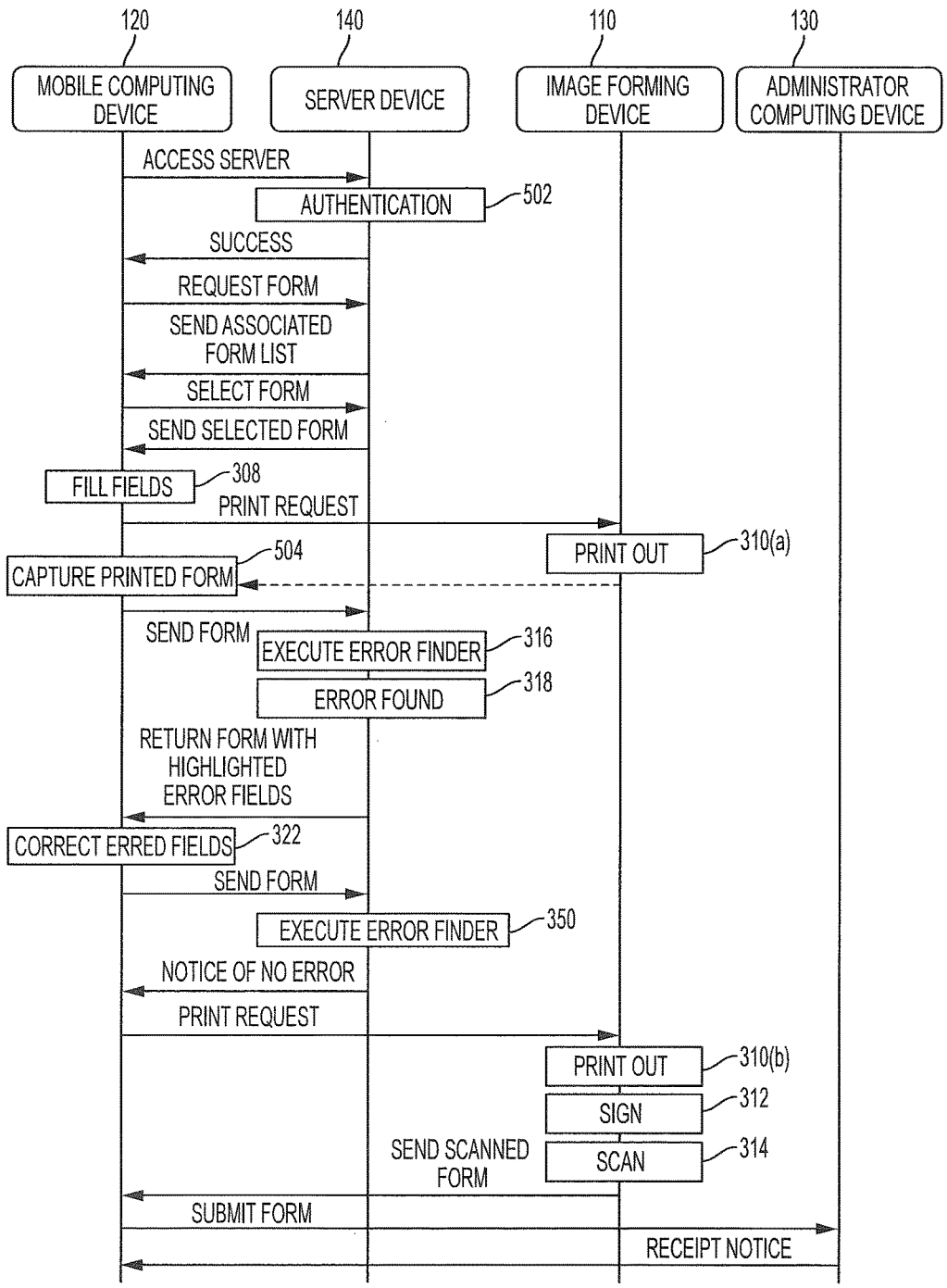
FIG. 15 is a form document submission flow process flowchart according to still yet other various embodiments.

FIG. 15 shows the workflow process according to still another embodiment, where the mobile computing device of the employee is used as the client computing device 120. In this instance, the employee initiates the form document submission workflow from the client computing device 120. In this embodiment, the employee captures the form document after filling in some fields using an embedded camera in the client computing device 120, and sends the captured image to the server device 140. The user may extract some employee information to be filled out in the form document from the employee information stored on the client computing device 120, instead of extracting the employee information from the cloud server 140. More specifically, the client computing device 120 accesses the server device 140 and the server device 140 performs authentication in operation 502. If the authentication is successful, the client computing device 120 sends a request form to the server device 140, and the server device 140 sends the associated form list as shown in FIG. 9. The employee selects one of the forms, and the selected form is sent by the server device 140 to the client computing device 120. The server device 140 sends the selected form to the client computing device 120, where the employee fills in the required fields without printing out the form. After the fields are filled in, the client computing device 120 sends a print request to the image forming device 110, which prints out the filled in form in operation 310(*a*).

The client computing device 120 captures the printed form, and sends the captured form to the server device 140 which executes the error finder module 148 in operation 316. If an error is found in operation 318, the form is returned to the client computing device 120 with the erred fields highlighted and the employee corrects the erred fields directly using the mobile computing device in operation 322 and sends the corrected form to the server device 140 for the error finder module 148 to be applied again in operation 350. The server device 140 sends a notice of no error to the mobile computing device 120, and the client computing device 120 sends a print request to the image forming device 110. Then, the image forming device 110 prints out the revised form, the employee signs the form in operation 312 and scans the signed form in operation 314. The scanned form is sent to the client computing device 120, and the employee then submits the scanned form using the client computing device 120 to the administrator computing device 130, which sends back a receipt notice to the client computing device 120.

Figure 16:
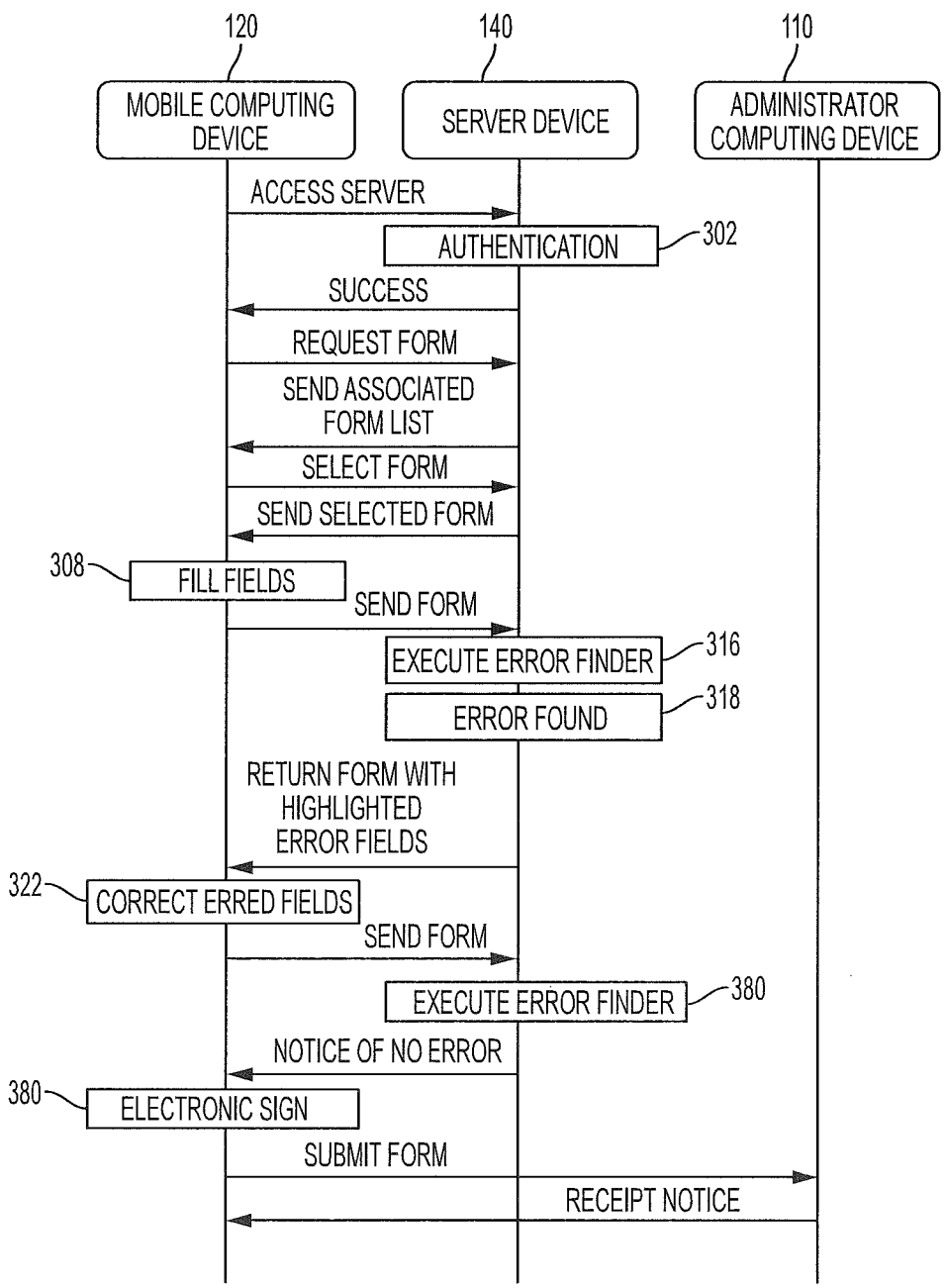
FIG. 16 is a form document submission flow process flowchart according to still yet further various embodiments.

FIG. 16 shows still yet another embodiment where the form submission workflow may be performed without ever actually printing the form. The client computing device 120 and the server device 140 communicate in the same way they did as in the form submission workflow shown in FIG. 15 through operation 308. Then, the client computing device 120 sends the filled in form to the server device 140 to execute the operation of the error finder module 148 (operation 316) and if the server device 140 finds errors in the form in operation 318, The server device 140 returns the form with the erred fields highlighted and the employee corrects the erred fields using the mobile computing device 120 in operation 322. The mobile computing device sends the corrected form back to the server device 140 for re-execution of the operation of the error finder module 148 in operation 350. If no error is found, the server device 140 sends the mobile computing 120 device a notice of no error with a print preview of the form. The employee then is able to electronically/directly sign his/her name in operation 380, submits the corrected form to the administrator computing device 130 and the administrator computing device 130 sends back a receipt notice to the mobile computing device 120. The employee may send the signed form back to the image forming device 110 via the NFC as well.

The electronic signature may be performed by using a signed image stored on the mobile terminal device 120 or the server device 140 and be retrieved from these devices. This signing operation also may be performed on the operation panel on the image forming device 110.

This example embodiment may skip, at least, the printing operation for printing the form and the scanning step for scanning the signed form. Although the above diagram shows the example embodiment where the form is submitted to the server device 140, the destination to submit the form may be any other devices.

As shown above, in some embodiments use the image forming device 110, some use the client computing device 120 and some embodiments use both the image forming device and the client computing device. Therefore, the image forming device 110, the client computing device 120 or a combination of both of these devices may be referred to as a user accessible device, which the employee may use to implement the various embodiments of the form document system described above.

ADDITIONAL FEATURES

In some of the example embodiments noted above, the user information such as user name, identification information, such as employee number, may be filled in the form document before being printed out.

In some of the example embodiments noted above, the destination to submit the scanned form document may be placed in the form document automatically when it is scanned.

This may be implemented, for example, by specifying the employee and associated information with the employee after the employee logs in to the image forming device 110. Or this information may be extracted from the server device 140.

In some other of the example embodiments noted above, the printed form document may include a graphical code image, such as a bar code or a QR code, and the code image may have information on the destination associated with the user. Then, after the form document is scanned, the image forming device 110 may decode the graphical code image and know the destination information automatically.

Not only the destination to submit the form document to execute the error finder module, but also the destination to finally submit the form document may be specified automatically as above.

The receipt notice sent from the destination to notify the client mobile terminal device 120 of the receipt of the submitted form document may include address information to check the actually submitted form document.

In some of the example embodiments noted above, the employee may store the used form document in order to reuse later. Or the employee may store the form document on a cloud server associated with the employee. In other embodiments, the employee may set or automatically set a finite lifetime to store the form document. This can be automatically set based on the due date, or on certain days, for example, 10 days, from the due date.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for processing a form document with one or more fields to be filled out, comprising:
   generating, at an administrator computing device, a plurality of form documents, form document identifiers associated with the respective form documents, and form data rules applicable to the respective form documents;
   registering, at a server device, the form documents, the form document identifiers associated with the form documents, and the form data rules applicable to the form documents, so as to be associated with a user;
   accessing, at a user accessible device, the server device;

verifying, at the server device, the user of the user accessible device;

requesting, at the user accessible device, a list of the plurality of form document identifiers associated with the user;

sending, at the server device, the list of the form document identifiers;

receiving, at the user accessible device, the list of the form document identifiers;

selecting, at the user accessible device, the form document from the listed form document identifiers;

receiving, at a user accessible device, the form document of the selected form document identifier;

filling out each field with a corresponding input, at the user accessible device;

sending the filled out form, from the user accessible device to the server device;

validating the filled out form document for each field, based upon the form data rule, at the server device;

if an error is found in any of the fields, highlighting the field with the error, and sending the highlighted form, from the server device to the user accessible device, for changes to the corresponding input to comply with the form data rule;

if no error is found in any of the fields, sending the highlighted form, from the server device to the user accessible device, as confirmation that no error is found;

submitting, from the user accessible device, the validated form document to the administrator computing device; and sending, from the administrator computing device, a receipt notice including address information to the user accessible device;

wherein the user accessible device comprises an image forming device and a client computing device, wherein:

the receiving of the form document and form document identifier, the filling out of each field with the corresponding input, and the sending of the filled out form document are at the client computing device;

if the error is found, the sending of the highlighted form is from the server device to the image forming device, the method further comprising:

printing out the highlighted form document including a graphical code including information on a destination of the highlighted form document at the image forming device;
  editing the highlighted form document;
  scanning the edited form document including the graphical code, at the image forming device; and
  sending the scanned edited form document, from the image forming device to the server device;

wherein the edited form document is stored at the user accessible device or remote location for later use, with an expiration date of the edited form document automatically set or set by the user, wherein the form document has the field with the associated destination, and when the filled in form document has no error in any field, the method comprises sending the filled in form document without errors automatically to the destination, from the server device.

2. The method according to claim 1, wherein the user accessible device comprises a client computing device, wherein:

if the error is found, changing the corresponding input for each field which is highlighted for having the error, on the client computing device, to generate an edited form document, and sending the edited form document to the server device for additional validation.

3. The method according to claim 2, wherein the client computing device is a mobile device.

4. The method according to claim 1, wherein the method further comprises:

if the server device finds no errors in any of the fields of the scanned edited form document, the method further comprises:
  sending a no error found indication from the server device to the image forming device, and
  submitting the error free scanned edited form document from the image forming device to the administrator computing device.

5. The method according to claim 1, wherein the method further comprises:

if the server device finds an error in any of the fields of the scanned edited form document, the method further comprises:
  returning the scanned edited form document with error to the image forming device;
  printing the scanned edited form document with error, at the image forming device;
  re-editing any field of the scanned edited form document with the error, at the client computing device;
  sending the re-edited scanned edited form document from the client computing device to the image forming device, and printing and scanning the re-edited scanned edited form document at the image forming device;
  sending the scanned re-edited scanned edited form document from the image forming device to the server device for another validation.

6. A form document submission system for processing a form document with one or more fields to be filled out, comprising:

an administrator computing device to generate a plurality of form documents, form document identifiers associated with the respective form documents, and form data rules applicable to the respective form documents;

a server device to register the form documents, the form document identifiers associated with the form documents, and the form data rules applicable to the form documents, so as to be associated with a user;

a user accessible device;

wherein the user accessible device accesses the server device, the server device verifies the user of the user accessible device, the user accessible device requests a list of the form document identifiers, the server device sends the requested list of the form document identifiers, the user accessible device receiving the list of the form document identifiers, the user accessible device selecting the form document from the listed form document identifiers, the user accessible device receives the form document and the form document identifier from the server device, fills out each field with a corresponding input, and sends the filled out form, from the user accessible device to the server device;

wherein the server device validates the filled out form document for each field, based upon the form data rule, if an error is found in any of the fields, highlights the field with the error, and sends the highlighted form to the user accessible device, for changes to the corresponding input to comply with the form data rule, if no error is found in any of the fields, sending the highlighted form to the user accessible device, as confirmation that no error is found;

the user accessible device submits the validated form document to the administrator computing device, and sending, from the administrator computing device, a receipt notice including address information to the user accessible device;

the user accessible device comprises an image forming device and a client computing device, wherein:

the client computing device receives the form document and form document identifier, fills out each field with the corresponding input, and sends the filled out form document;

if the error is found, the server device sends the highlighted form document to the image forming device;

the image forming device prints out the highlighted form document including a graphical code including information on a destination of the highlighted form document, receives an edited form document after edits are made, scans the edited form document including the graphical code, and sends the scanned edited form document to the server device; and the edited form document is stored at the user accessible device or remote location for later use, with an expiration date of the edited form document automatically set or set by the user, wherein the form document has a field with an associated destination address, and when the filled in form document has no error in any field, the server device sends the filled in form document without errors automatically to the destination.

7. The form document submission system according to claim 6, wherein the user accessible device comprises:

a client computing device, wherein:

if the error is found, the client computing device changes the corresponding input for each field which is highlighted for having the error, on the client computing device, to generate the edited form document, and sends the edited form document to the server device for additional validation.

8. The form document submission system according to claim 7, wherein the client computing device is a mobile device.

9. The form document submission system according to claim 6, wherein:

if the server device finds no errors in any of the fields of the scanned edited form document:

the server device sends a no error found indication to the image forming device, and the image forming device submits the error free scanned edited form document to the administrator computing device.

10. The form document submission system according to claim 9, wherein:

if the server device finds an error in any of the fields of the scanned edited form document:

the server device returns the scanned edited form document with error to the image forming device;

the image forming device prints the scanned edited form document with error;

the client computing device enables re-editing of any field of the scanned edited form document with the error;

the client computing device sends the re-edited scanned edited form document to the image forming device, wherein the image forming device prints and scans the re-edited scanned edited form document, and sends the scanned re-edited scanned edited form document to the server device for another validation.

11. A method, comprising:

registering, at a server device, a form document with one or more fields, a form document identifier associated with the form document, and a form data rule applicable to the form document, so as to be associated with a user;

authorizing, at an image forming device, the user;

retrieving, at the image forming device, the form document and the form document identifier;

printing, at the image forming device, the retrieved form document with the form document identifier;

scanning, at the image forming device, the form document with fields filled by the user, and transmitting the scanned form document to the client computing device;

sending, from the client computing device to the server device, the form document with the filled fields and the form document identifier to the server device;

validating, at the server device, the form document, based on the form data rule corresponding to the form document identifier;

sending, from the server device to the image forming device, the validation result;

printing, at the image forming device, the validation result; submitting, from the image forming device to the server device, the filled form document, upon determining no error is found;

determining whether an error exists for each of the one or more fields during the validating based on the filled data and the form data rule, at the server device;

highlighting each field where an error exists, at the server device; and sending, from the server device to the image forming device, the highlighted filled form document;

editing each highlighted field of the form document to input another value;

scanning the edited form document including a graphical code, at the image forming device;

sending the scanned edited form document with the graphical code including information on a destination of the highlighted form document from the image forming device to the server device;

validating, at the server device, the edited form document, based on the form data rule; and sending the validated form document from the server device to the image forming device to be printed; wherein the edited form document is stored at the user accessible device or remote location for later use, with an expiration date of the edited form document automatically set or set by the user, wherein the form document has a field with an associated destination address, and when the filled in form document has no error in any field, the server device sends the filled in form document without errors automatically to the destination.

* * * * *